FIG.I.

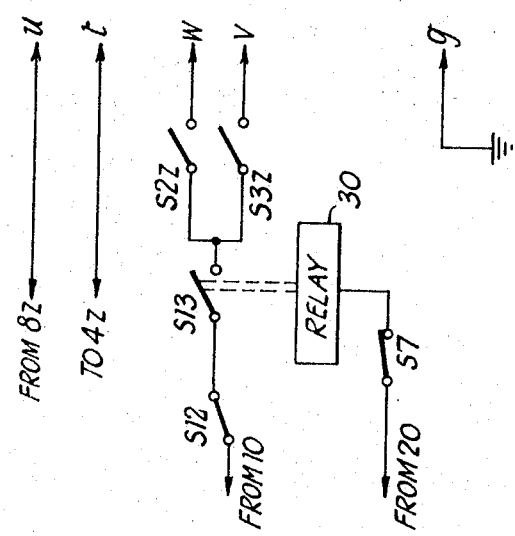
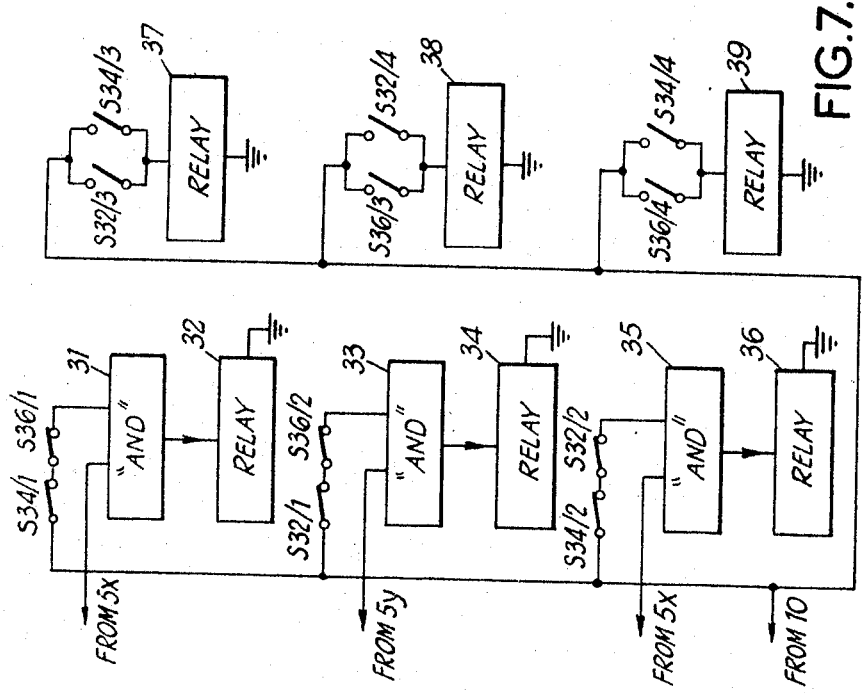

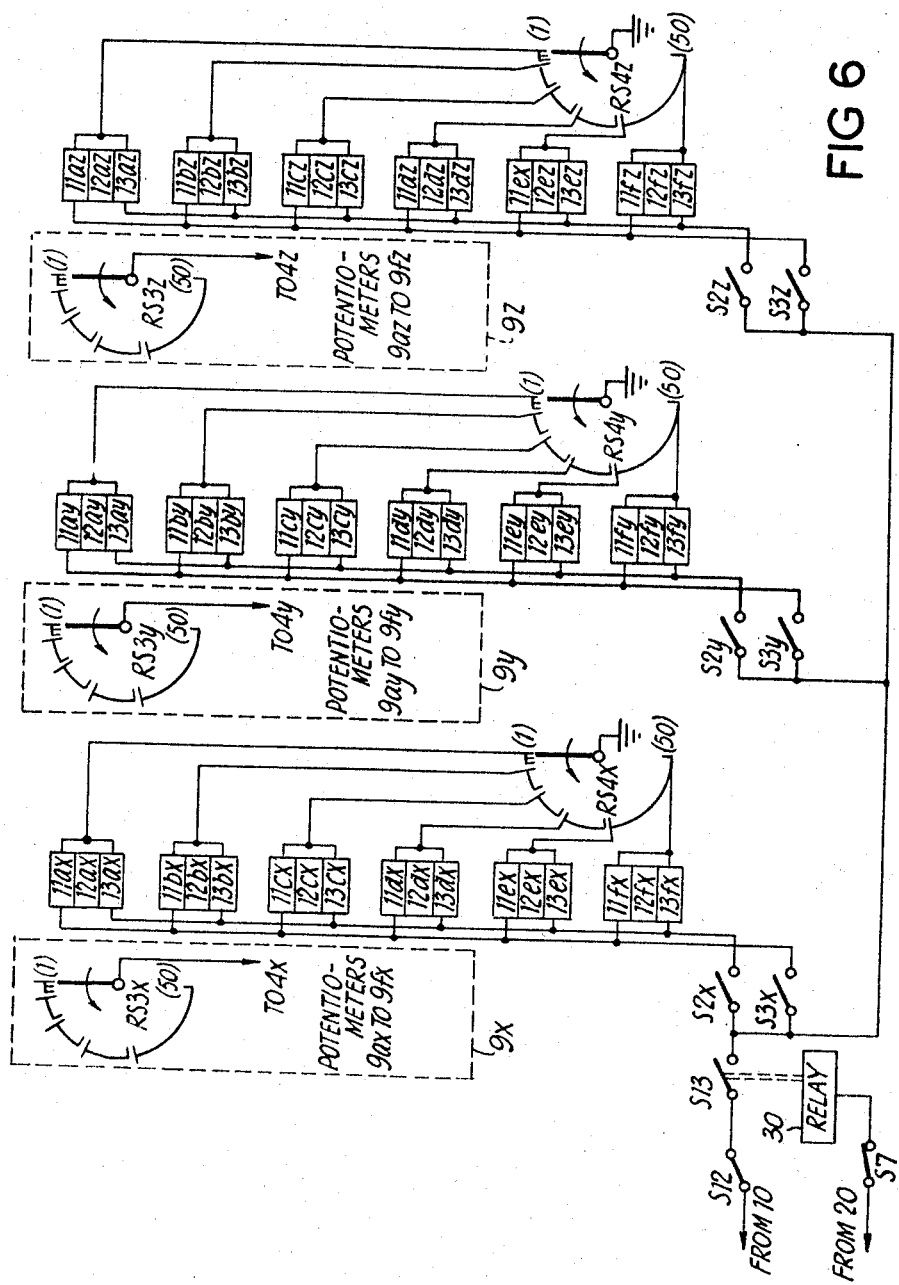

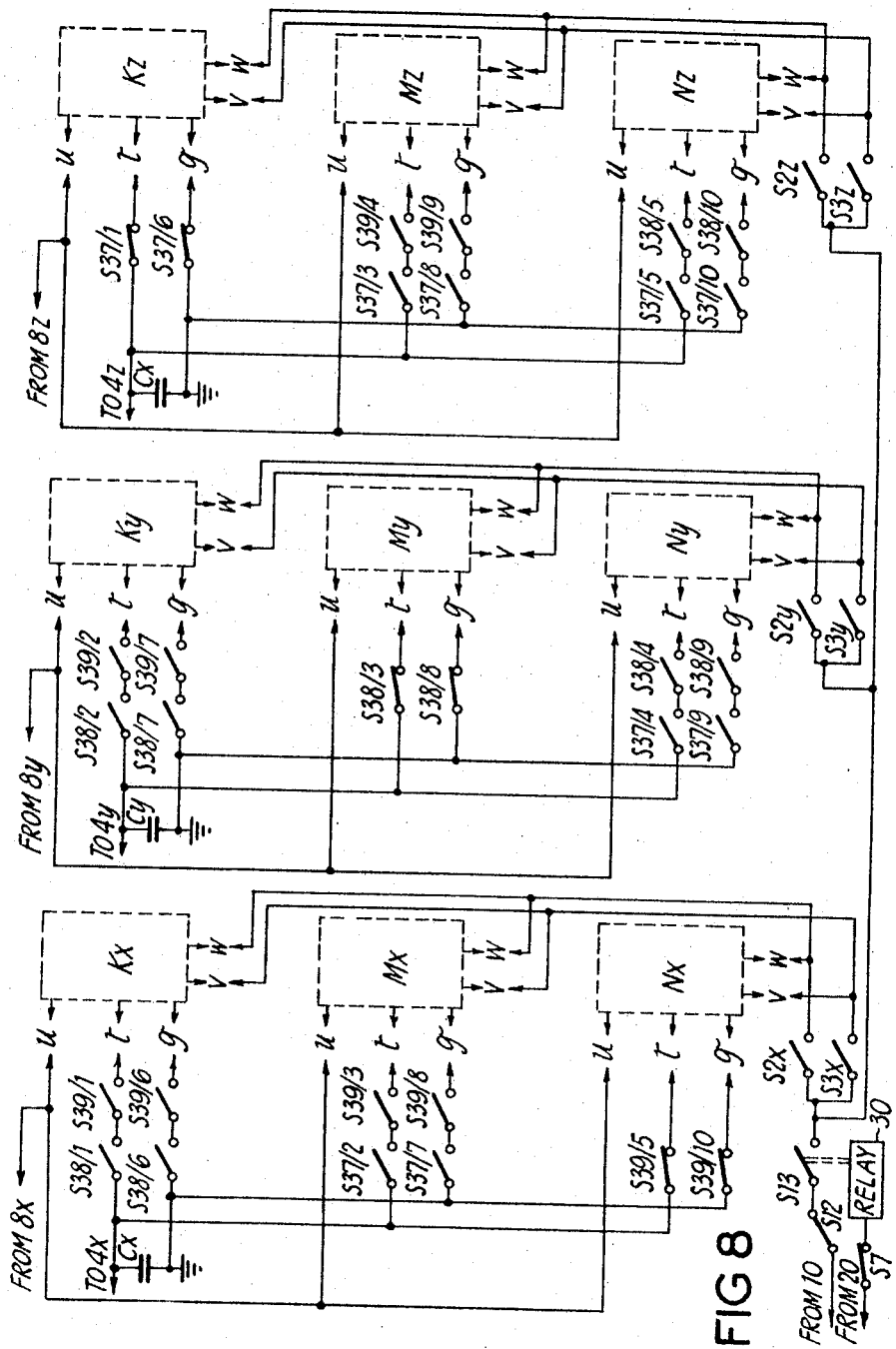

United States Patent Office 3,447,871
Patented June 3, 1969

3,447,871
PHOTOGRAPHIC COLOUR PRINTERS AND PROCESSES
Denis M. Neale, Ilford, England, assignor to Ilford Limited, Essex, England, a British company
Filed Jan. 4, 1966, Ser. No. 518,683
Claims priority, application Great Britain, Jan. 4, 1965, 294/65
Int. Cl. G03b 27/76, 27/04
U.S. Cl. 355—18     5 Claims

ABSTRACT OF THE DISCLOSURE

Method and apparatus for printing transparencies onto photographic print material wherein the printing is automatic and self-optimizing. The printer initially prints all types of negatives indifferently, but as the various negatives are returned for reprinting with pushbutton corrections, stepping motors progressively move potentiometers controlling various predetermined exposure integrals so that each type of negative is finally printed in optimum color and density balance.

---

This invention relates to photography and more particularly to the production of photographic prints from either positive or negative transparencies. The invention is applicable to the printing of black-and-white negatives, but it is especially of value in the production of photographic positive colour prints from colour negatives.

It has been well established that the vast majority of natural scenes have reflectances which integrate to grey (Pitt and Selwyn, Photo. J., 78, 115–121, 1938). Saturated natural hues are normally associated with relatively low peak spectral reflectances. Consequently the chromaticity of integrated reflected light is determined primarily by the pale, desaturated colours such as may occur in autumn grass, sky, sand and stone.

If a positive colour print reproduces a natural scene faithfully, the integrated reflectance of the print will, in general, integrate to grey. It has even been argued that, in those cases in which the original scene does not integrate to grey, the most satisfactory print is one which does integrate to grey.

In an attempt to provide the optimum printing conditions for a colour negative, it is known practice so to proportion the intensity or duration of the exposures to red, green and blue light that when all of the printing light transmitted by the whole of the negative is integrated and employed to expose the print material, the exposed print material after processing shall be grey.

This is usually achieved by using photocells responsive respectively to red, green and blue parts of the spectrum, which photocells respond to light passing through the whole of the negative area and proportion the times or intensities of exposures to red, green and blue light so that the integrated exposure received by the print material is one which, if uniformly distributed, would, after processing, produce grey.

This method, which will be referred to as "whole-negative total integration," commonly suffers from "subject failure." This may arise from the above-noted phenomenon that saturated natural colours are dark colours. Consequently, saturated colours always record as low-density areas in the negative. The photocells respond to the transmittance of the negative, rather than its opacity. Consequently the colour balance determined by whole-negative total integration is seriously affected by saturated colours, whereas the integrated reflectance of a natural scene or a satisfactory print is not. As a result a negative containing an extended area of a relatively saturated colour is commonly printed unsatisfactorily if whole-negative total integration is relied upon implicitly.

Known methods of automatically controlling the colour balance of printing exposures are aimed at compensating so far as possible for the following variables:

(1) Variations in the characteristics of the negative material such as arise between one batch and another or as a result of variations in storage or processing.

(2) Variations in colour quality of the light by which the negative was exposed.

For the reasons just described, however, methods of compensation which successfully correct for such variations frequently produce unwanted changes in colour balance when negatives are printed that contain extended areas of relatively saturated colour. It is common practice to reprint such negatives with predetermined integrals of exposure of the print material to red, green and blue light modified according to the manner in which a first print has proved unsatisfactory.

Thus, for example, a particular negative representing predominantly blue sea and blue sky may lead to a first print in which there is an excess of yellow dye. The negative is accordingly reprinted with the printer adjusted, typically by the depression of a push-button switch, designated "plus blue" to reduce the value of the predetermined integral of exposure of print material to blue light so that the resultant print after processing to colour contains less yellow dye than the first print.

Normally the readjusted value of exposure integral is used only for prints from the particular negative or from negatives judged to be similar. If, however, it is found that, for one of the colours of printing light, red, green or blue, more corrections are needed in one sense than another, then it is common practice to make an appropriate adjustment of the value of predetermined exposure integral to that colour of light, usually on an independent control.

Adjustments of this nature may be necessary from time to time for a variety of reasons:

(a) At a particular time of year a "subject failure" of a particular kind may occur sufficiently frequently to justify readjustment of exposure integrals in the printer. In winter a high proportion of negatives depicting snow scenes may require abnormally low values of predetermined exposure integrals for all three colours, red, green and blue. In spring, rich green grass and foliage may require an abnormally low integral of green light exposure only. In summer, a high proportion of negatives representing seascapes could require an abnormally low integral of blue light exposure.

(b) Photoelectric exposure control provides incomplete correction for variations in contrast (gamma) in one or more of the three colour images in the negative. At different times of year, the average quality of negative may vary due to differences between one batch and another or as a result of variations in storage and processing. It is therefore necessary to readjust the predetermined values of exposure integral from time to time to correct for such variations in average negative quality.

(c) Successive batches of print material commonly show significant differences in emulsion sensitivity. Even a single batch will often show a progressive change in sensitivity with time.

It should be noted that whereas the adjustments required to compensate for (c) lead to a standard quality of print from any particular negative, this is not the case as regards adjustments to compensate for (a) and (b). Adjustments to compensate for changes in (a) or (b) correspond to a change in "aim point" for the density and colour balance of a standard test negative.

Adjustment of a colour negative printer to provide optimum allowance for the above factors presents considerable practical difficulty. A large quantity of information relating to assessment of first prints must be accumulated and interpreted. On the basis of this information, adjustments must be made to the predetermined integrals of the printer. Human error can easily arise at any stage and as a result adjustments may be made increasing rather than reducing the departure from optimum adjustment at any one time. Also, it will be appreciated by those skilled in the subject of closed loop control systems that corrections should be applied at frequent regular intervals if the printer adjustments are to follow closely the constantly changing optimum requirements. When conscious intervention is required to adjust the exposure integrals of a printer, it too readily happens that adjustments are estimated according to information which does not represent the most recent output of that printer. In such an event the printer may unwittingly be over-corrected first in one sense, then in another.

It will be appreciated that whereas the foregoing has been framed primarily in terms of colour photography, the invention is applicable also to black-and-white photography. Moreover the apparatus required is then relatively simple.

It is an object of the present invention to provide a printer system in which the need for conscious interpretation of necessary printer adjustments is substantially eliminated.

According to the invention, therefore, there is provided a method of printing transparencies onto photographic print material which comprises exposing print material to light in a spectral band until a predetermined integral of light against time has been administered, as determined by a photoelectric exposure integrator, processing said print material to produce a visible image, assessing said print material after processing to detect excess or deficiency of that image-forming constitutent controlled by exposure to light in said spectral band, producing in respect of a print showing such excess a signal of a first form and in respect of a print showing such deficit a signal of a second form, applying signals of said first and second forms to a differential accumulator, the output of which changes in one sense in response to signals of said first form and in the reverse sense in response to signals of said second form, and providing connection between said differential accumulator and said photoelectric integrator such that an excess of signals of said first form over signals of said second form causes the predetermined integral of light against time to be adjusted in value so that subsequent prints will contain a reduced amount of image-forming constitutent after processing and a deficiency of signals of said first form relative to signals of said second form causes the predetermined integral of light against time to be adjusted in value so that subsequent prints will contain an increased amount of image-forming constituent after processing.

By image-forming constituent is meant silver when the method is applied to the printing of block-and-white prints, or dyes or pigments when the method is applied to the printing of multicolour prints.

Accoridng to another feature of the present invention, there is provided a method of printing multicolour transparencies onto multicolour print material selectively sensitive to light in three spectral bands, which method comprises effecting with respect to each particular band the steps of exposing print material to light in said particular band until a predetermined integral of light against time has been administered, as determined by a photoelectric exposure integrator, processing said print material to colour, assessing said print material after processing to detect excess or deficiency of that dye or pigment controlled by exposure to said particular spectral band, producing in respect of a print showing such excess a signal of a first form and in respect of a print showing such deficit a signal of a second form, applying signals of said first and second forms to a differential accumulator, the output of which changes in one sense in response to signals of said first form and in the reverse sense in response to signals of said second form, and providing connection between said differential accumulator and said photoelectric integrator such that an excess of signals of said first form over signals of said second form causes the predetermined integral of light against time to be adjusted in value so that subsequent prints will contain a reduced amount of dye or pigment after processing to colour and a deficiency of signals of said first form relative to signals of said second from causes the predetermined integral of light against time to be adjusted in value so that subsequent prints will contain an increased amount of dye or pigment after processing to colour.

In one convenient embodiment it is arranged that statistical information relating to printer optimisation is derived from the pushbuttons used for correction of exposure balance on negatives which have to be reprinted. If, for example, more corrections are required corresponding to a reduction of the exposure integral to green light than correspond to an increase, then the predetermined exposure integral to green light is arranged to be reduced gradually. In one embodiment of the invention, there is associated with each colour of printing light, red, green and blue, a reversible stepping motor driving through a reduction gear train, a potentiometer controlling the predetermined integral of exposure to that colour. On each occasion that a "plus" correction is used in respect of any colour, the corresponding stepping motor moves in one direction. On each occasion a "minus" correction is used for the same colour, the stepping motor moves in the reverse direction. A single movement of the stepping motor causes an almost insignificant movement of the potentiometer, but if the forward and backward movements are not equal, the potentiometer will gradually be moved in that direction which improves the optimisation of the printer. By this it is intended to convey that, when the printer is in optimum adjustment the number of "plus" and "minus" corrections required by a particular photoelectric integrator are substantially equal. This condition corresponds closely to the condition in which the printer provides the maximum proportion of acceptable prints from a range of typical negatives printed without the use of pushbutton correction.

The method allows also the automatic interpretation of information regarding density correction. When a density correction button of a printer is depressed, the predetermined exposure integrals to all three colours of printing light are modified in the same ratio. In one embodiment of the invention, therefore, it is arranged that whenever a "plus" density correction is used, stepping motors associated with all three colours are caused to move in one direction and in the opposite direction when a "minus" density correction is used.

In operating a colour negative printer of known type, a particularly acute difficulty is that of setting up and maintaining in optimum adjustment the setting of the so-called "slope controls." Slope controls provide systematic variation of the predetermined exposure integral to one or more colours of light in accordance with the integrated transmittance of the negative being printed. By careful adjustment of the slope controls, a printer may be made to produce a high proportion of acceptable prints from negatives which are even quite severely under or overexposed. Such negatives are sensitive to relatively minor changes in the shape of the characteristic curves of the negative film stock. Consequently the slope controls of a colour negative printer may require frequent readjustment to follow differences arising between one batch of negative film stock and another, or changes in negative processing affecting curve shape.

In one form of the invention, therefore, a plurality of alternative predetermined exposure integrals in provided in respect of each colour, red, green and blue. Each alternative exposure integral corresponds to an alternative range of integrated negative transmittance said alternative ranges being substantially mutually exclusive. Exposure of a particular negative to at least one colour, red, green and blue, is made according to one of the predetermined integrals, that integral being chosen according to the integrated transmittance of the particular negative. When a negative is reprinted with a pushbutton correction of exposure integrals, the stepping motor or other differential accumulator makes an incremental adjustment only to that predetermined integral which corresponds to the integrated transmittance of the particular negative.

According to one particular embodiment of the invention, assessment of integrated negative transmission is based on the time required to complete an exposure integral. Thus exposure may commence according to one predetermined exposure integral. After a predetermined time the first predetermined exposure integral is replaced by a second. After a further predetermined time, the second predetermined integral is replaced by a third, and so on. Since negatives of low integrated transmittance in general require longer exposure times than negatives of higher transmittance, it follows that the first predetermined exposure integral relates to negatives of relatively high integrated transmittance, and the second and third integrals to negatives of progressively lower integrated transmittance.

According to an alternative embodiment of the invention the intensity of light incident on the negative is modified substantially in inverse proportion to the integrated transmittance of the negative and alternative predetermined exposure integrals are selected according to the setting, for a particular negative, of the light-modulation means, e.g., according to the current drawn by the printing light source.

According to a preferred embodiment of the invention, progressive degrees of diffusion are placed in the path of light incident on the negative until a predetermined intensity of light passes substantially in the direction of the lens forming an image of the transparency on the print material, the predetermined value of exposure integral being selected from a plurality of alternative values according to the degree of diffusion with which the negative is printed.

According to one form of the invention, therefore, multicolour transparencies are classified into a plurality of categories according to their integrated transmittances, a separate differential accumulator being associated with each combination of one of said spectral bands and one of said categories, each accumulator receiving signals of said first and second forms in respect only of prints from transparencies classified into the corresponding category, the output of each accumulator being connected to the photoelectric integrator controlling exposure to the corresponding spectral band to predetermine an integral of printing light against time which integral is effective only when printing negatives classified as belonging to that particular category.

In the commercial printing of amateur colour negatives a further difficulty arises when it is required to print negatives of different manufacture. Because the shapes of their characteristic curves differ or because they use different dyes, negatives of different manufacture will usually require different settings of slope control. For this reason, it is known practice to provide automatic colour negative printers with separate "channels" for alternative types of negative, i.e., the printers are provided with alternative controls for the exposure integrals to red, green and blue light and are provided also with corresponding alternative slope controls. When negatives of one manufacture are being printed, one channel is used, when negatives of an alternative manufacture are being printed, a switch is moved to select another channel, i.e., to make operative an alternative set of predetermined exposure integrals and slope controls.

In practice the use of alternative printer channels is only partially successful. There are now several types of negative containing integral colour masks and several containing no such masks. Even if a printer is provided with an equally large number of channels, it is a matter of extreme difficulty to keep each channel in optimum adjustment for the corresponding type of negative. More generally a printer is adjusted for whichever type of negative is most commonly met and other types are printed on the same channel. As a result, the less common types of negative are seldom printed well.

In a further preferred form of the present invention, provision is made for the automatic optimisation of a number of such channels. Furthermore, the printer may be of such a design that, for each negative, the appropriate channel is selected automatically. This eliminates the confusion and wastage of print material arising when a negative is inadvertently printed with a channel selection switch at an inappropriate setting.

In the further preferred form of the invention, the negatives are classified not only according to integrated transmittance, but also according to the ratios of transmittances of light of at least two of the three colours, red, green and blue. In this way distinction may readily be made between negatives of alternative manufacture. For example, the ratio of transmittances of blue light and red light is relatively high for an unmasked negative (e.g., the currently available "Agfacolor" negative) and lower for a masked negative (e.g., the currently available "Kodacolor" and "Ilfocolor" negatives). Also a typical "Kodacolor" negative may be distinguished from an "Ilfocolor" negative by the lower ratio of transmittances of green light and red light arising from the presence of a magenta mask in the "Kodacolor" negative. (The words Agfacolor, Kodacolor and Ilfocolor are registered trademarks.)

In illustration, the following is a method of executing the further preferred form of the invention for the printing of Agfacolor, Kodacolor and Ilfocolor negatives. When any negative is to be printed, an automatic assessment of negative transmittance is made to determine which category of exposure integral is required, i.e., whether it should correspond to an under-exposed negative, a correctly exposed negative or an over-exposed negative. This assessment of transmittance may be based on any of the methods set out above. Printing commences with the photoelectric integrator of blue light responsive to the predetermined integral of blue light appropriate to the assessed category of Agfacolor negative. The photoelectric integrator of red light is initially responsive to the integral of red light appropriate to the assessed category of Kodacolor negative. The photoelectric integrator of green light is initially responsive to the integral of green light appropriate to the assessed category of Ilfocolor negative.

With an appropriate colour quality of printing light, the exposure integral to be completed first will be blue in the case of an Agfacolor negative, red for Kodacolor and green for Ilfocolor. It is arranged that completion of exposure to one colour initiates switching of the exposure integrators corresponding to colours to which exposure is incomplete, such switching causing predetermined values of exposure integral to be selected appropriate to the assessed category of negative of manufacture corresponding to that colour of light to which exposure is first complete. For example when an Ilfocolor negative is printed, exposure to green light is completed before exposures to blue or red light. Completion of exposure to green light is arranged to render the blue-light and red-light integrators repsonsive to exposure integrals appropriate for an Ilfocolor negative of the assessed category of transmittance. Thus no matter which type of negative is printed, exposures to red, green and blue light are terminated at predetermined integrals appropriate to the particular type of negative and the particular range of integrated transmittance in which that negative lies. When pushbutton corrections are used in reprinting a particular negative, moreover, the stepping motor adjusts only that predetermined exposure integral according to which exposure to a particular colour is terminated.

Thus an automatic printer has been described which is selfoptimising. Initially it may print all types of negative indifferently. But as the various types of negative are returned for reprinting with pushbutton corrections, stepping motors progressively move the potentiometers controlling the various predetermined exposure integrals. Progressive movement of a potentiometer ceases when the numbers of "plus" and "minus" corrections associated with that potentiometer become equal. Thus the printer reaches stability when each type of negative is printed in optimum colour and density balance, whatever the category of negative transmittance. Moreover further changes in potentiometer settings occur automatically as the printer is used and in a sense to compensate so far as possible for changes in average characteristics of any or all of the types of negative printed.

According to a further form of the invention, therefore, multicolour transparencies are classified into a plurality of categories according to their integrated transmittances said categories being subdivided into subcategories according to mutually exclusive ranges of the ratios of integrated transmittances to light in separate spectral bands, red, green and blue, of the spectrum of printing light, a separate differential accumulator being associated with each combination of one of said spectral bands and one of said subcategories, each accumulator receiving signals of said first and second forms in respect only of prints from transparencies classified into the corresponding subcategory, the output of each accumulator being connected to the photoelectric integrator controlling exposure to the corresponding spectral band to predetermine an integral of printing light against time which integral is effective only when printing negatives classified as belonging to that subcategory.

In order to illustrate the invention reference is now made to the accompanying drawings in which.

FIGURES 3 to 6 all relate to circuits for automatic printers which also have means for classifying transparencies according to their integrated transmittance.

Figure 3:
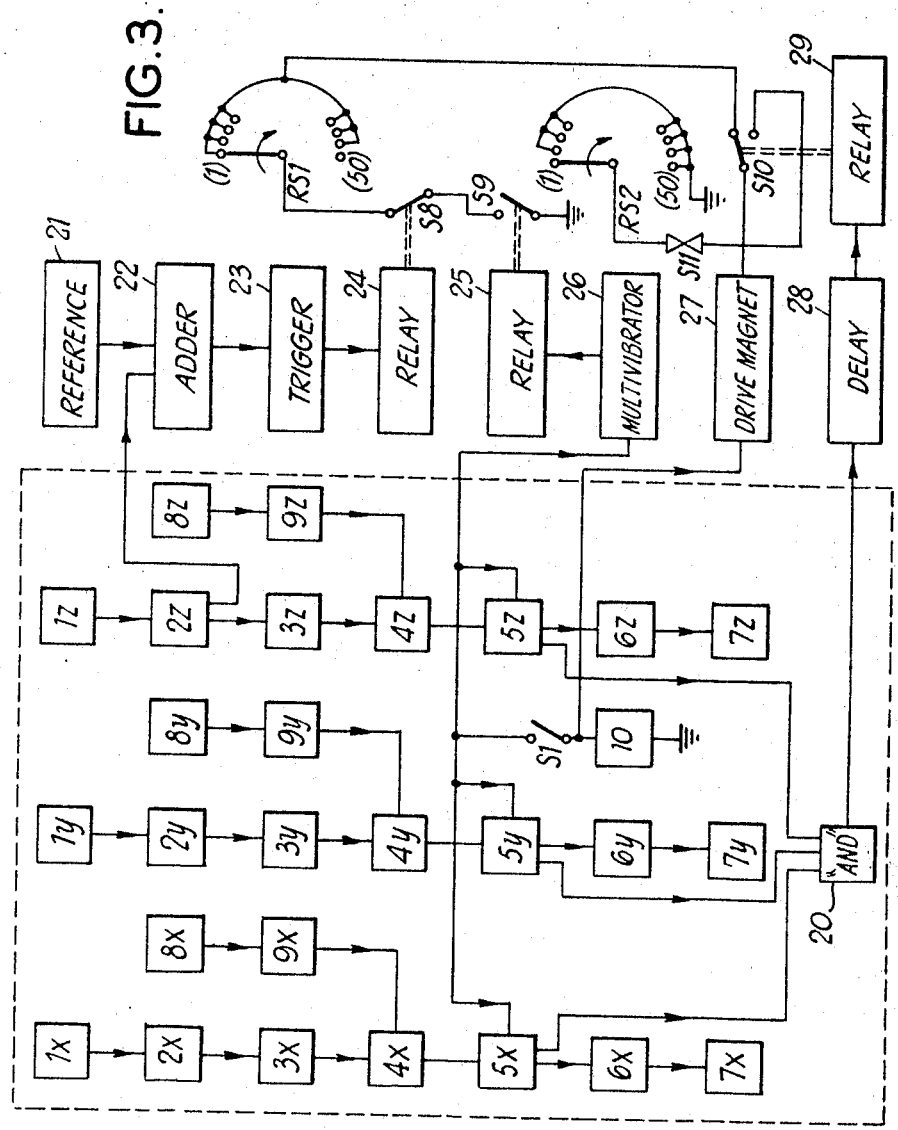

FIGURE 3 in particular relates to an exposure control circuit having separate integrators for red, blue and green, there circuits being connected to a differential accumulator which has means for classifying the transparencies.

Figure 4:
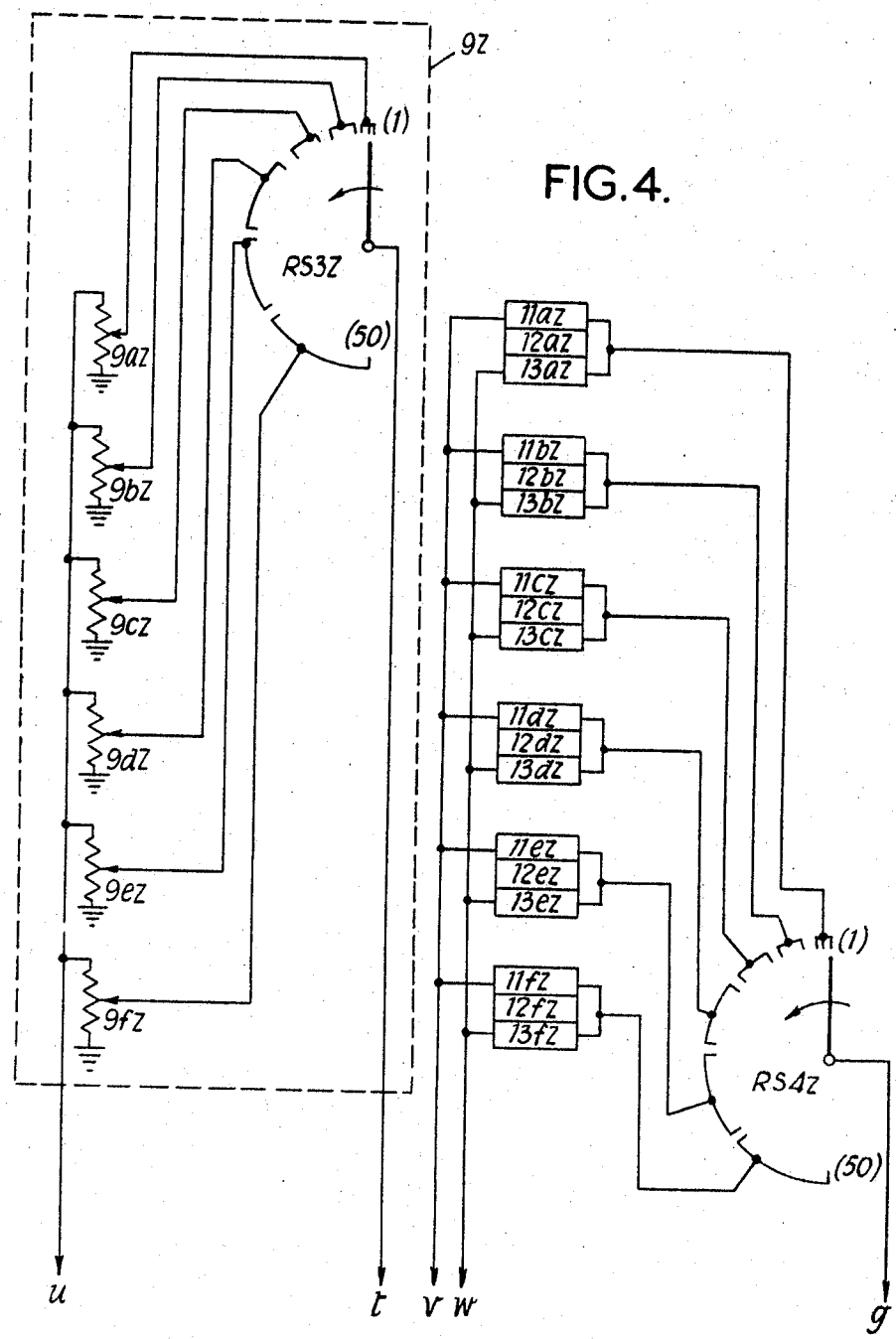

FIGURE 4 is a schematic diagram of a further circuit necessary to execute the classification.

FIGURE 5 is a schematic diagram of a circuit showing how the elements in FIGURE 4 are connected to the elements in FIGURE 3.

FIGURE 6 is a schematic diagram of a circuit for an automatic printer which has separate classification means in respect to each colour.

FIGURES 7 and 8 relate to circuits for automatic printers which also have means for classifying transparencies according to their integrated transmittance and according to the type of "mask" they have.

FIGURE 7 is a schematic diagram of the circuit arrangement which can be employed to ensure that as soon as exposure to light of one colour has terminated subcircuits controlling exposure to the other two colours are replaced by subcircuits appropriate to that process corresponding to the colour for which the exposure has already terminated.

FIGURE 8 is a schematic diagram showing the circuit if channels $x$, $y$ and $z$ control exposures to blue, green and red light respectively.

Figure 9:
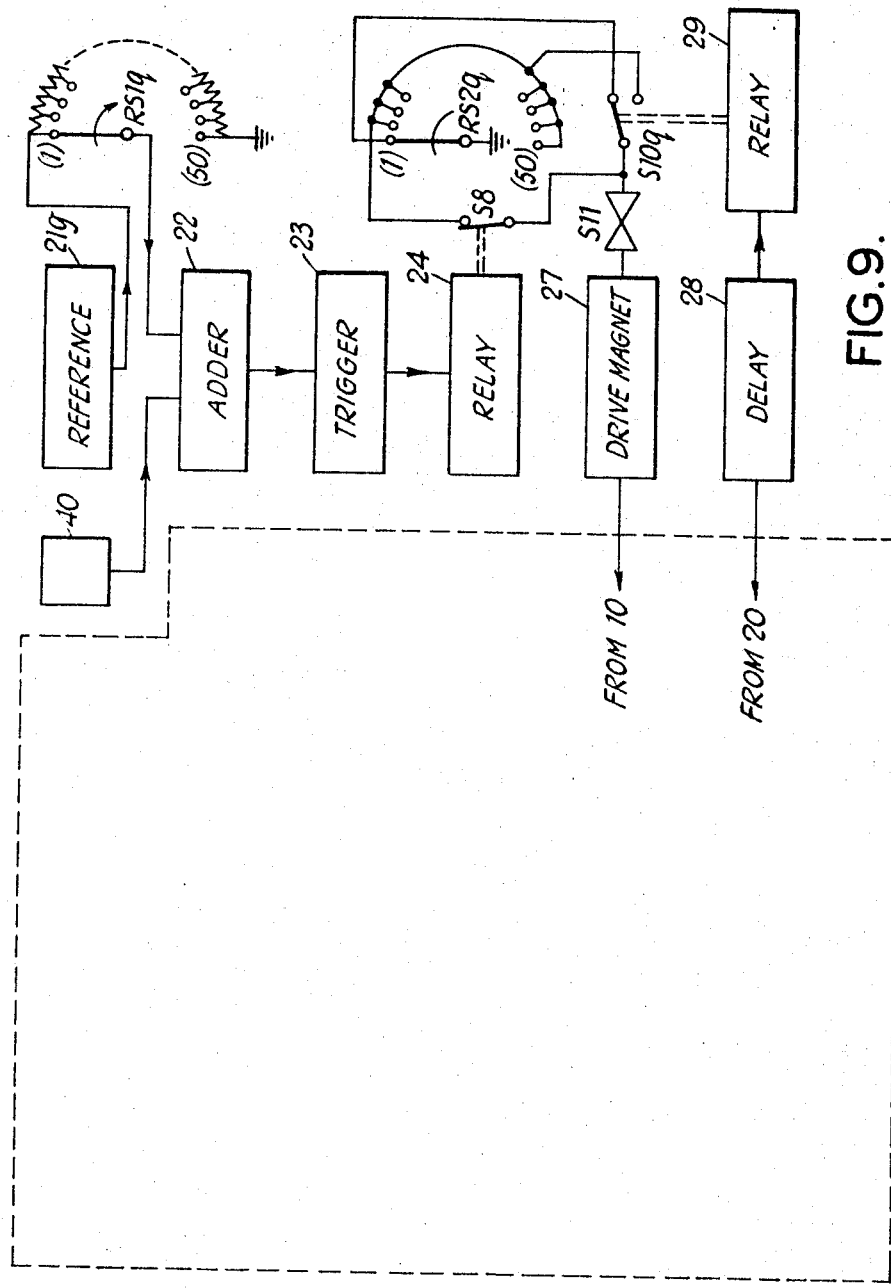

FIGURE 9 is a schematic diagram of a circuit which may be employed to effect the classification of transparencies according to their integrated transmittance in an alternative manner to that shown in FIGURE 3.

Figure 1:
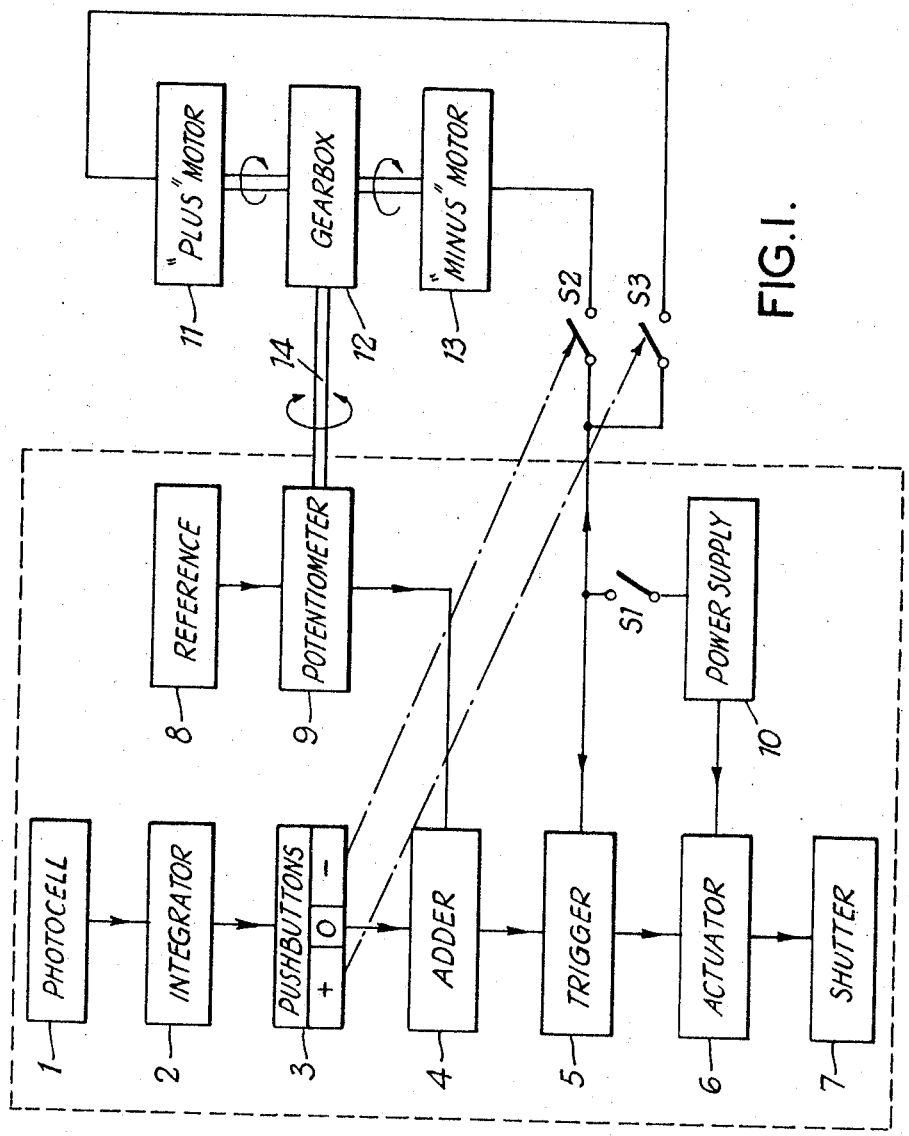
FIGURE 1 represents a schematic diagram of a photoelectric exposure control circuit of an automatic printer having connected to the circuit a differential accumulator.

A first embodiment of the invention will now be described with reference to FIG. 1. In FIG. 1, the area surrounded by the broken line represents a schematic diagram of the photoelectric exposure control circuit of a typical automatic printer according to the known art. In the passive condition, current from power supply 10 holds actuator 6 energised so that shutter 7 is closed and light from the printing lamp (not shown) is unable to reach the print material (not shown). To expose a print, switch $S_1$ is closed. Current from power supply 10 then sets the bistable trigger device 5 so that actuator 6 is deenergised and shutter 7 opens under control of a return spring (not shown). Opening of shutter 7 allows printing light to fall on the print material. A proportion of printing light also falls on photocell 1, giving rise to a current proportional to the intensity of printing light reaching photocell 1. Current from photocell 1 passes to a current integrator 2, usually a capacitor. Integration of current by the integrator 2 produces a voltage increasing with time. This voltage may be attenuated in a ratio variable by selection of which one of about seven pushbutton switches is closed. In a machine intended for printing from negative transparencies, adjacent buttons would provide attenuation ratios substantially in the proportion 1.2 to 1.0, the buttons designated "plus" providing more attenuation than those designated "minus."

The output voltage from the integrator, after suffering attenuation determined by the pushbuttons 3 is applied to the voltage adding circuit 4. The other input to the adder 4 is a voltage obtained from a voltage reference source 8 and attenuated by an adjustable potentiometer 9. The two inputs to the adder 4 are of opposite polarity. Accordingly the output of the adder falls to zero when the two inputs are equal in magnitude.

The output of the adder 4 is applied to trigger device 5 and thereby holds actuator 6 in the deenergised condition. When the output of adder 4 falls to zero, trigger device 5 reverts to the opposite bistable condition and so energises actuator 6 closing shutter 7 and terminating exposure of the print material. If switch $S_1$ is now opened, the apparatus is once more in the passive condition assumed initially.

A printer according to the known art just described requires occasional adjustment of potentiometer 9 to correct for variation in sensitivity of print material or photocell 1. This adjustment is normally made after assessment of the relative proportions of excessively dark and excessively light prints produced when only the middle (zero or "0") button of the pushbuttons is used. If a surfeit of dark prints is produced, the shaft 14 of potentiometer 9 is rotated manually in a direction reducing the proportion of the voltage from the reference source 8 applied to adder 4. As a result, subsequent prints will be terminated at a smaller value of output voltage from integrator 2.

In the present invention readjustment of potentiometer 9 is effected automatically by elements 11, 12 and 13 which together constitute a differential accumulator. Elements 11 and 13 are similar unidirectional stepping motors of known type (e.g., solenoid, pawl-and-ratchet motors). They provide the two input drives to a differential gearbox 12, the output from which is coupled to the potentiometer shaft 14.

It will be appreciated by those skilled in the art that the functions of elements 11, 12, 13, can advantageously be served by a single reversible stepping motor of known type. For the purposes of explanation, however, it is preferred here to describe an embodiment using separate unidirectional motors.

Switch $S_3$ is coupled to the pushbuttons 3 so that if any of the "plus" buttons is closed, $S_3$ will be closed. Similarly $S_2$ is coupled to the pushbuttons so that closure of any "minus" button closes $S_2$. If the zero button is closed, neither $S_2$ nor $S_3$ closes. When a print is made with the zero button closed, as is usually the case on first attempting to print a negative, neither stepping motor 11 nor 13 will be energised.

When a batch of prints has been exposed and processed, those not considered satisfactory are returned to the printer for printing again with selected pushbutton corrections. For each print requiring a "plus" button correction, $S_3$ will close and cause the "plus" stepping motor 11 to make one step. Through the gearbox 12 it will produce a small rotation of shaft 14 in the direction reducing the proportion of voltage from source 8 passed to adder 4. The adjustment so made is, however, very small. Its effect on print density may be in the range 0.1% to 1.0% of that produced by the pushbutton itself.

For each print requiring a "minus" button correction, $S_2$ will close and cause the "minus" stepping motor 13 to make one step. Through the gearbox 12 it will produce a small rotation of shaft 14 equal to, but opposite in direction to, that produced by one step of the "plus" motor 11.

It will be seen, therefore, that when negatives are being printed a second time shaft 14 will make a series of small rotations in accordance with the pushbutton corrections being used. If the printer is already in good adjustment, the numbers of "plus" and "minus" corrections used will be substantially equal. Accordingly the position of shaft 14 will never move far from its original position. If, however, the printer was originally producing a surfeit of dark prints, the "minus" corrections required will outnumber the "plus" corrections. Accordingly shaft 14 will make a net movement in that direction producing a reduction in voltage from source 8 passed to the adder 4. As a result, by the time the corrected prints have all been exposed, the setting of potentiometer 9 has been reset to a new value providing prints which are less dark.

In order to lead neither to over-correction nor to confusion of the print examiner, it is important that the gearbox 12 be chosen so that the rate of correction is sufficiently small. Provided the rate is restricted as specified above, it will normally be found that between the beginning and end of printing a set of corrected prints the change in setting of potentiometer 9 is equivalent to less than one button step on the pushbuttons 3.

Figure 2:
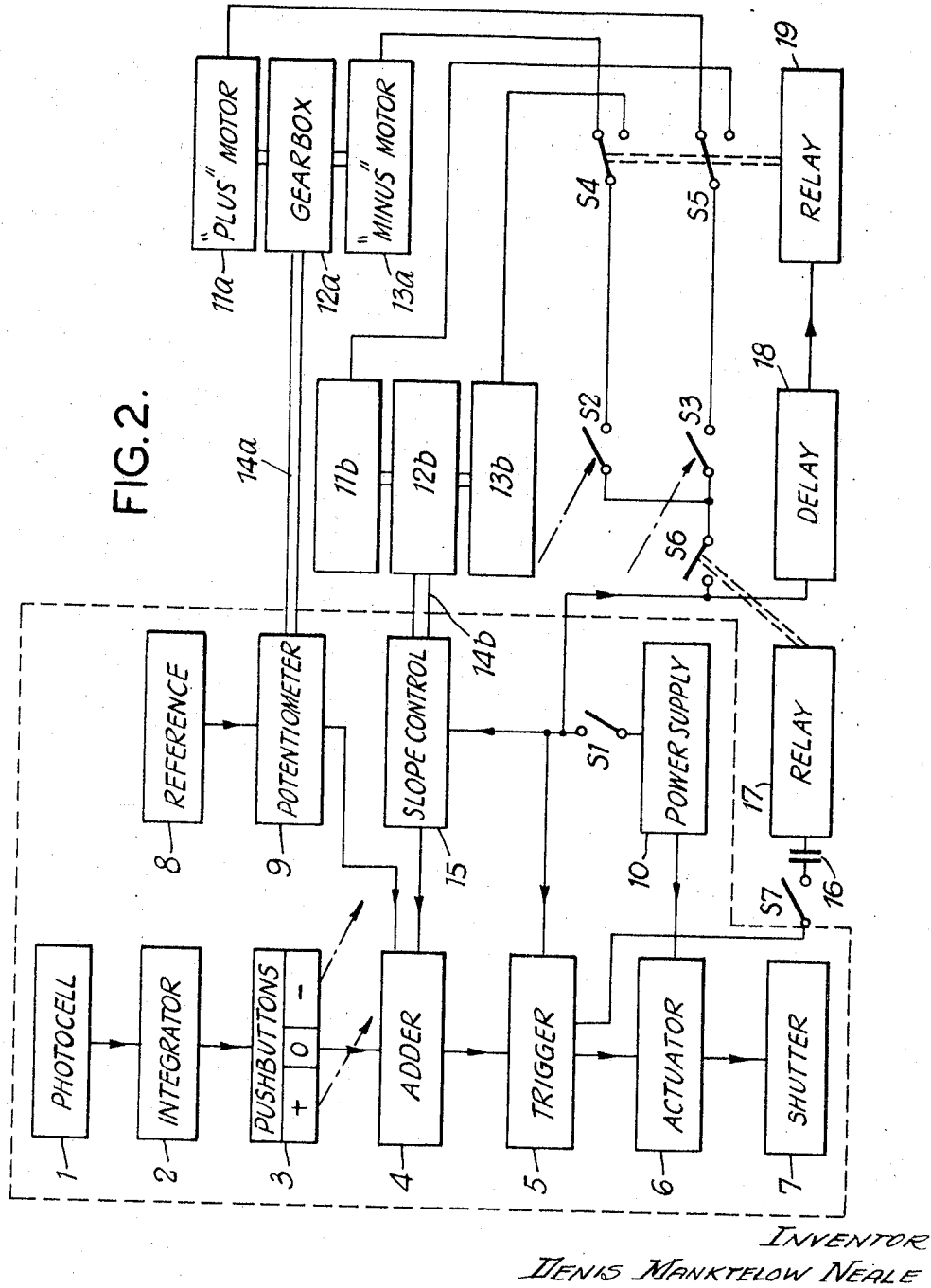
FIGURE 2 is similar to FIGURE 1 but included in the circuit there is a means for "slope control."

The area enclosed by broken line in FIG. 1, may be considered representative not only of an automatic printer for black and white transparencies, but also of one of the three channels of a typical automatic colour negative printer. The invention may be applied to such a printer merely by repeating in respect of each colour, red, green and blue, of printing light, the embodiment shown in FIG. 1. In the case of a colour negative printer, it is important to note that whereas a "plus" density correction produces an increase in exposure to all three colours of printing light, a "plus" correction to any one colour is customarily taken to indicate that the exposure to that colour of printing light is to be reduced. In this way the print is made to contain less dye or pigment absorbing that colour. To facilitate explanation it is hereinafter to be understood that a "plus" correction to any exposure integrator produces an increase in the controlled integral of light against time and that a "minus" correction produces a reduction in controlled integral. It is well known that in practical colour negative printers it is commonly necessary to provide that the exposure integral is varied systematically with negative density. This systematic variation is effected by the use of additional circuitry commonly known as a "slope control." In FIG. 2, the area surrounded by the broken line shows a typical exposure control for one channel of a colour negative printer and including slope control according to the known art. In FIGS. 1 and 2, like parts are indicated by like designations.

In FIG. 2, the slope control circuit 15 receives power from supply 10 when switch $S_1$ is closed to initiate exposure of a print. Slope control 15 applies to adder 4 a voltage varying with time according to the predetermined position of control shaft 14b. Thus the integral of light against time required to terminate exposure is not a constant quantity, but changes progressively with time.

Commonly it is arranged that potentiometer 9 affects the controlled exposure integral applied to all negatives but that slope control 15 additionally affects the controlled exposure integral applied to negatives of relatively high optical density while affecting very little the integral applied to negatives of relatively low optical density.

When such a known type of printer requires adjustment, therefore, it is customary first to adjust in each colour channel potentiometer 9 by shaft 14a to produce prints of acceptable density and colour balance from negatives of relatively low density. Thereafter slope control 15 is adjusted by shaft 14b to produce prints of acceptable density and colour balance from negatives of relatively high density.

The embodiment of the invention shown in FIG. 2 provides automatic adjustment of shafts 14a and 14b of one channel of such a colour printer according to the known art. In a preferred form of this embodiment, the elements shown in FIG. 2 are repeated in respect of each of three exposure control channels.

In FIG. 2 the supply to switches $S_2$ and $S_3$ is additionally controlled by switch $S_6$ operated by relay 17. Relay 17 is coupled to trigger circuit 5 by capacitor 16 so that relay 17 is briefly energised only when trigger 5 moves from that condition holding actuator 6 deenergised to that condition producing energisation of actuator 6.

When switch $S_1$ is closed to initiate exposure of a print, therefore, $S_6$ is initially open. Current passing $S_1$ energises a delay circuit 18 which is arranged to energise a relay 19 after a time interval corresponding to the time required to expose prints from negatives of intermediate density. If a negative of relatively low density is being printed, therefore, trigger 5 energises actuator 6 before relay 19 energises. Accordingly when relay 17 is briefly energised, $S_6$ closes and, if a "plus" pushbutton correction has been used for the exposure, current passes via $S_3$ and $S_5$ to the "plus" stepping motor 11a coupled via gearbox 12a and shaft 14a to potentiometer 9. Alternatively, if a "minus" pushbutton has been used, current passes via $S_2$ and $S_4$ to the "minus" motor 13a. Thus when a negative of relatively low density is printed, use of a pushbutton correction causes the appropriate stepping motor 11a or 11b to advance one step and so make a small readjustment of the potentiometer 9.

When a negative of relatively high density is printed, relay 19 will have energised before relay 17 operates. Energisation of relay 19 causes switches $S_4$ and $S_5$ to move to the position opposite to that shown in FIG. 2. Consequently, when trigger 5 energises actuator 6, relay 17 briefly closes $S_6$ to either of the switches $S_2$ or $S_3$ which may be closed and thence via $S_4$ or $S_5$ to one of the stepping motors 11b or 13b. If a "plus" pushbutton has been used in printing the dense negative, therefore, the "plus" motor 11b will make one step and, through gearbox 12b will make a small rotation of shaft 14b to adjust slope control 15 in a sense producing greater exposure of prints from dense negatives. Similarly, if a "minus" button has been used for printing the dense negative, the "minus" motor 13b will make one step and the slope control 15 will be adjusted in the direction producing a reduction in exposure of prints from dense negatives.

It will be appreciated that the embodiment just described with reference to FIG. 2 provides automatically adjustments of potentiometer 9 and slope control 15 which correspond to lack of balance between the "plus" and "minus" button corrections used in printing negatives of relatively low and relatively high densities respectively. The automatic adjustments will be in the appropriate sense provided the pushbutton corrections are primarily corrections estimated by inspection of prints recently made on the same printer.

When the pushbutton corrections have been estimated either from prints made in the distant past or on another printer, the automatic adjustment of elements 9 and 15 must be suspended. This may conveniently be done by opening switch $S_7$ in series with capacitor 16 and relay 17.

The embodiment just described with reference to FIG. 2 is subject to certain limitations. In the first place, it is well known that a relatively simple slope control of the type implied is often found inadequate. With such a slope control it may be found that the required colour and density of print are obtainable only in respect of negatives of two particular densities. To provide more flexibility of adjustment of slope control a larger number of control shafts 14a, 14b, etc., is required.

The second limitation arises because classification of negatives between low density and high density groups may affected by the use of a pushbutton correction. Suppose, for example, a negative of intermediate density is printed in a time a little less than that determined by delay 18. Suppose also that the resultant print density is unsatisfactory. If the negative is printed again with a "minus" correction, the shaft 14a will be given a small rotation in the "minus" direction. If, however, the negative is printed with a "plus" correction, the exposure time may become sufficiently extended for delay 18 to have energised relay 19 before exposure is terminated. In this case an impulse is given not to shaft 19a but to 14b. The direction of this impulse corresponds to the "plus" direction. There is thus a tendency for negatives of intermediate density to produce an excess of "minus" corrections to potentiometer 9 and an excess of "plus" corrections to slope control 15. Normally this will eventually be opposed by compensating corrections derived from the low density and high density negatives. These will usually outnumber the relatively small proportion of negatives producing the effect just described. Accordingly the effect described is not usually serious in a printer according to FIG. 2.

If a more flexible form of slope control is used, e.g., one provided with separate corrections for dense negatives and negatives of extremely low density, the negatives must be classified into a corresponding greater number of density groups so that pushbutton corrections can influence the separate control shafts 14a, 14b, etc., selectively. In this case, the above described effect can become serious. It is then necessary to classify negatives into density groups in a manner which will not be affected by the use of a density button in printing. Embodiments hereafter described meet this requirement and provide also a method of exposure control allowing each of a large number of negative densities to be printed automatically in a required density and colour balance.

In FIG. 3 the area enclosed by the broken line includes elements to be found in a typical automatic colour negative printer according to known practice. Elements identified by the numerals 1 to 9 correspond to similarly identified elements in FIG. 1. The suffixes $x$, $y$ and $z$ relate to channels controlling exposure to three colours of printing light. Typically these colours are red, green and blue, but not necessarily in that sequence. For convenience, the three channels $x$, $y$ and $z$, share a common power supply 10. Element 20 is an "AND" gate which delivers an electrical output when all three trigger circuits 5x, 5y, 5z have energised their respective actuators 6x, 6y, 6z.

In FIG. 3, closure of switch $S_1$ to initiate exposure of a print provides also energisation of a multivibrator circuit 26 cyclically energising relay 25 and thus closing and opening switch $S_9$ about 20 times per second. Delay circuit 28 energises relay 29 about 200 milliseconds after an electrical output is delivered by "AND" gate 20. When the output from 20 ceases, however, delay circuit 28 causes relay 29 to become deenergised in a relatively short time, e.g., 20 milliseconds. When $S_1$ is closed, trigger circuits 5x, 5y, 5z are set to a condition removing the output from "AND" gate 20. Relay 29 therefore deenergise and moves $S_{10}$ to the position shown before relay 25 first closes switch $S_9$. Thus at each closure of $S_9$, current flows from supply 10, through driving magnet 27 and switches $S_{10}$, RS1, $S_8$ and $S_9$ to ground. At each energisation of drive magnet 27 the moving contacts of the associated 50-position rotary selector switches RS1 and RS2 advance one step, starting from the position 1.

Provided switch $S_8$ remains closed, therefore, RS1 and RS2 advance to position 50 in about 2½ seconds. When position 50 is reached, RS1 breaks the circuit from supply 10 to ground and drive magnet 27 no longer responds to closure of switch $S_9$. In general, however, relay 24 will have opened switch $S_8$ before fixed contact 50 is reached.

In FIG. 3, reference source 21, adding circuit 22 and trigger circuit 23 are similar to elements 8, 4 and 5 respectively. It will be appreciated that because the output of integrator 2z is applied directly to the adder 22 without passing through pushbutton attenuator 3z, trigger circuit 23 energises relay 24 at a time dependent on density of the negative being printed, but independent of any pushbutton correction which may be applied. Moreover, reference source 21 is chosen to deliver an output voltage sufficiently small to ensure that relay 24 is energised before actuator 6z, irrespective of which button is depressed in the pushbutton attenuator 3z.

From the foregoing it will be seen that closure of $S_1$ causes RS1 and RS2 to advance from position 1 at about 20 steps per second. After a time dependent on negative density to light of colour corresponding to channel $z$, relay 24 opens switch $S_8$ and RS1 and RS2 advance no further. The position then reached by RS1 and RS2 is therefore an indication of negative density. This position will hereafter be referred to as the "pause" position. In the following description, it will be assumed that according to the different "pause" positions they produce, negatives are classified into six density groups designated $a$, $b$, $c$, $d$, $e$ and $f$ respectively, group $a$ corresponding to negatives of lowest density and group $f$ to negatives of highest density.

By way of example, it will be assumed that the relationship between the density groups $a$ to $f$ and rotary selector switch pause positions 1 to 50 are as follows:

| Density group— | Pause position of rotary selector |
|---|---|
| a | 1 to 3 inclusive. |
| b | 4 to 6 inclusive. |
| c | 7 to 10 inclusive. |
| d | 11 to 20 inclusive. |
| e | 21 to 35 inclusive |
| f | 36 to 50 inclusive |

FIG. 4 represents further circuit elements necessary to execute the embodiment described with reference to FIG. 3. FIG. 5 shows how the elements in FIG. 4 are connected to those in FIG. 3. In FIG. 4, RS3z and RS4z are rotary selector switches mechanically coupled to RS1 and RS2 and operating in synchronism with them. Elements in FIG. 4 enclosed by the broken line jointly serve the function of element 9z in FIG. 3. It will be seen therefore that as the selector switch RS3z advances from position 1 to position 50, each of the potentiometers 9az to 9fz is connected in turn in the place of potentiometer 9z in FIG. 3.

Thus, for example, if a negative in density group $d$ is to be printed, relay 24 stops RS1, RS2, RS3z and RS4z in a "pause" position lying between position 11 and position 20 inclusive. In such a pause position, the sliding contact of potentiometer 9dz is connected to adder 4 and the exposure integral controlled by channel $z$ is determined by the setting of potentiometer 9dz.

In this way negatives in density group $a$ to $f$ can be printed with different exposure integrals each controlled by the setting of the corresponding potentiometers 9az to 9fz respectively. It will be appreciated that this arrangement provides more flexibility of adjustment than does the known type of slope control referred to in connection with element 15 in FIG. 2.

With the circuit arrangement shown in FIG. 4, the moving contact of RS3z should be of the "make-before-break" variety.

It is to be understood that the circuit arrangement shown in FIG. 4 in respect of channel z is to be repeated in respect of the other two channels x and y as indicated in FIG. 6. It is not necessary, however, to repeat the elements in FIG. 3 not enclosed by the broken line. A single assessment of negative density may be applied to all three channels since, for a given type of negative material an abnormal negative density to one colour usually implies a correspondingly abnormal density to the other two channels. Referring to FIGS. 3, 4, 5 and 6, therefore, it is to be understood that drive magnet 27 operates simultaneously all light selector switches RS1, RS2, RS3x, RS3y, RS4x, RS4y and RS4z. Moreover, it is to be understood that, although not so drawn, switch position 1 is effectively adjacent to position 50. That is to say successive impulses from the drive magnet 27 produce positions ". . . 47, 48, 49, 50, 1, 2, etc."

From the foregoing description, it will be seen that when a negative is printed the rotary selector switches advance to a pause position selecting for each colour channel x, y and z, potentiometers 9x, 9y and 9z which are used only in printing negatives belonging to the same density group a to f. By suitable adjustment of all such potentiometers it is thus possible to provide prints of a required density and colour balance in respect of negatives in any such group. The required density and colour balance correspond to those for which the "plus" and "minus" pushbutton corrections are statistically equal. It remains only to describe the method of selectively adjusting the appropriate potentiometers in accordance with the pushbutton corrections used.

When printing of a negative is complete, trigger circuits 5x, 5y and 5z cause an output to appear from "AND" gate 20. Provided $S_7$ is closed, therefore, relay 30 energises immediately and closes switch $S_{13}$. Current from supply 10 can then flow through $S_{12}$ and $S_{13}$ and thence through any of the switches S2x, S2y, S2z, S3x, S3y, S3z which may be closed because a pushbutton correction has been used. Switches S2x, S2y, S2z, close in response to "minus" corrections applied to the x, y and z channels respectively. Switch S2z is connected to one pole of each of the six "minus" stepping motors 13az to 13fz, each of which is coupled through one of the gearboxes, 12ax to 12fz to the corresponding one of potentiometers 9az to 9fz. The other pole of each "minus" stepping motor, together with one pole of the corresponding "plus" stepping motor, is connected to a group of fixed contacts on RS4z. The group of contacts correpsonds to the group on RS3z to which is connected the sliding contact of the associated potentiometer.

Thus if a negative in density group d is printed with a "minus" correction in channel z, the rotary selector switch will assume a "pause" position between positions 11 and 20 inclusive, the exposure integral in channel z will be determined by the combination of the setting potentiometer 9dz and the pushbutton correction applied to pushbutton attenuator 3z and, moreover, when relay 30 closes $S_{13}$, current flows through S2z and RS4z to energise "minus" motor 13dz and so to apply a small adjustment to the setting of potentiometer 9dz in a sense reducing exposure integrals subsequently controlled by channel z with negatives of density group d.

It will be seen from inspection of FIG. 5 that provision is made for simultaneous repsonse to corrections in any or all channels. Moreover the correction in any one channel may be in either the same or in the opposite sense to that in any other channel.

Delay circuit 28 energises relay 29 after a time interval when an output is produced by "AND" gate 20, sufficiently to allow operation of any of the stepping motors 11ax to 11fz or 13ax to 13fz. When relay 29 is energised, it opens switch $S_{12}$ and moves $S_{10}$ to the position opposite to that shown in FIG. 3. Opening of switch $S_{12}$ causes all stepping motors to become deenergised.

When $S_{10}$ moves to the reverse condition to that shown in FIG. 3, drive magnet 27 is energised by current passing contacts $S_{11}$ and rotary selector switch RS2. As the magnet 27 becomes energised, however, it attracts an armature (not shown) which opens contacts $S_{17}$, thereby deenergising magnet 27. Thus according to known practice the rotary selector switch will step rapidly until position 1 is reached. At position 1 RS2 breaks the circuit to ground and magnet 27 remains deenergised. If switch $S_1$ is now opened, the apparatus returns to the initially-assumed standby condition.

The embodiment just described with reference to FIGS. 3 to 6 represents a colour negative printer which will automatically adjust to an optimum the density and colour balance in which prints are made from negatives in a number of different density groups. If negatives of one manufacture only are used in conjunction with such a printer, the quality of print produced can be very high. If, however, two or more alternative types of negative are printed, the corrections used in respect of one type of negative may produce adjustments in settings of potentiometers 9x, 9y and 9z which impair the performance of the printer with an alternative type of negative. In practice poor results would be expected if the same printer were to be used for printing negatives produced by three different processes, one of which (process N) uses no integral colour mask, a second one of which (process M) uses an integral yellow mask for the blue absorption of the magenta dye, and a third one of which (process K) uses yellow and magenta masks for the blue and green absorptions of the magenta and cyan dyes respectively.

With reference to FIGS. 3, 4, 7 and 8, an embodiment will now be described which provides an automatic printer providing prints in optimum density and colour balance in respect of each density group of each of three such negative processes, K, M and N. To provide this result, a printer includes subcircuits Kx, Ky, Kz, Mx, My, Mz, Nx, Ny, Nz, indicated by the broken lines in FIG. 8. Each such subcircuit comprises the circuit configuration shown in FIG. 4. "AND" gates 31, 33, 35, control relays 32, 34, 36, which through associated contacts S32/1 to S32/4, S34/1 to S34/4 and S36/1 to S36/4 control further relays 37, 38, 39 in FIG. 7. Relays 37, 38, 39 in turn operate associated contacts S37/1 to S37/10, S38/1 to S38/10 and S39/1 to S39/10 so that when a negative of a given type K, M or N, is printed the appropriate subcircuit (Kx, Ky, Kz), (Mx, My, Mz), or (Nx, Ny, Nz) is used to control the exposure integrals in channels x, y and z. The said contacts also ensure that any bushbutton corrections used in printing a negative produce adjustments only in the settings of those potentiometers which were used to control exposure integrals in the printing of that negative.

The convention is here used that S36/3 indicates the third switch contact operated by relay 36. All relay contacts are shown in the positions occupied when the corresponding relays are deenergised.

When printing negatives of three different types, K, M and N, as defined above, it is possible to choose a combination of printing light quality and print material sensitivity such that when acceptable prints are made from negatives of the three types, the following conditions are met:

(i) For negative process K, exposure to red light terminates before exposure to either blue or green light.

(ii) For negative process M, exposure to green light terminates before exposure to either blue or red light.

(iii) For negative process N, exposure to blue light terminates before exposure to either green or red light.

The embodiment here described is intended to be used with printing light quality adjusted so that conditions (i), (ii) and (iii) are observed .

By way of illustration, FIG. 8 shows the circuit arrangement used if channels $x$, $y$ and $z$ control exposures to blue, green and red light respectively.

From examination of FIG. 8 it will be seen that printing of any negative commences with control channel $x$ responsive to subcircuit N$x$ channel $y$ responsive to subcircuit M$y$ and channel $z$ responsive to subcircuit K$z$. Thus no matter which negative process is being printed, the exposure intergral first completed is necessarily controlled by the subcircuit N$x$, M$y$ or K$z$ appropriate to that process.

FIG. 7 shows the circuit arrangement used to ensure that as soon as exposure to light of one colour has terminated subcircuits controlling exposure to the other two colours are replaced by subcircuits appropriate to that process corresponding to the colour for which the exposure has already terminated.

Since the circuit arrangement in FIGS. 7 and 8 is symmetrical with respect to all three colours, it is necessary only to describe the printing of any one type of negative in order to illustrate the functioning of the circuit.

Suppose a negative of process M is to be printed and suppose further that the negative has a density to red light such that it belongs to density group $d$. When switch S1 (FIG. 3) is closed, the rotary selector switch assumes a pause position corresponding to group $d$. The pause position must be reached before exposure to any colour terminates. With negative process M, exposure to green light terminates before exposure to red or blue light, An output from trigger 5$y$ then passes to "AND" gate 33 and, with the voltage applied from supply 10 through switches S32/1 and S36/2, produces an output from "AND" gate 33 which energizes relay 34. Contacts S34/1 and S34/1 are operated by relay 34 to disconnect supply 10 from "AND" gates 31 and 35. Thus energisation of relay 34 inhibits energisation of relays 32 and 36.

It will be understood therefore that energisation of relay 34 is an indication that a negative of process M is being printed and that subcircuits N$x$ and K$z$ are to be disconnected and replaced by subcircuits M$x$ and M$z$. This function is performed by relays 37 and 39 which are energised by closure of contacts S34/3 and S34/4 associated with relay 34.

Referring now to FIG. 8, it will be seen that when relay 37 is energised S37/1 opens and breaks the circuit from terminal $t$ of K$z$. At the same time, however, contacts S37/3 and S39/4 lose to connect terminal $t$ of M$z$ to element 4$z$ of FIG. 3. In a similar manner S39/5 opens to disconnect N$x$ from element 4$x$ and S37/2 and S39/3 close to connect M$x$ to 4$x$ in its stead.

In switching the potentials to be applied to 4$x$, 4$y$ and 4$z$, it is important that the applied potential shall not momentarily fall to zero since this would lead to immediate operation of the appropriate trigger 5$x$, 5$y$ or 5$z$. Accordingly capacitors C$x$, C$y$, C$z$, are shown which, on opening of one switch, maintain the previously applied input potential until a new potential is applied as a result of closure of other switches.

When exposure to all through colours is complete, relay 30 energises and closes S$_{13}$ to apply to appropriate stepping motors impulses corresponding to any pushbutton corrections used in printing the negative. From FIG. 8 it will be seen that relays 37 and 39 connect terminals $g$ of M$x$, M$y$ and M$z$ to ground at the same time as they connect terminals $t$ to elements 4$x$, 4$y$ and 4$z$. It follows therefore that whatever the type or density group of negative, a pushbutton correction produces a response only in a stepping motor associated with the potentiometer controlling the exposure integral to the corresponding colour of printing light of negatives of that type and density group.

The foregoing embodiments have been described with reference to the known type of printer in which the intensity of light incident on the negative is initially the same for negatives of all densities. In such a known type of printer it is common practice to insert from time to time a standard test negative and to measure the times of the automatically controlled exposures to red, green and blue light. Any departure of such measured times from previously determined values is taken to indicate an undesirable variation in printer performance and action is usually taken to restore the times to their original values. By this means, corrections may simply be made for variations in sensitivity of the photocells 1$x$, 1$y$, 1$z$.

In the embodiments described above, similar measurements with a standard test negative are of little value and may even be misleading. Because the settings of potentiometers 9$x$, 9$y$ and 9$z$ are constantly changing, a standard test negative cannot be expected to give rise to constant measured exposure times. It is therefore not practicable to use observed exposure times as a measure of photocell sensitivity. Embodiments described therefore require exposure control circuits of good stability measured over the time taken to print a batch of negatives, process the prints, estimate required corrections and expose further prints from the negatives in accordance with the estimated corrections. Known methods of meeting this requirement include the method described in British patent specification No. 943,105.

In all the foregoing embodiments, assessment of negative density (or integrated transmittance) has been effected by measuring the time required to complete a predetermined integral of light against time in respect of light transmitted by the negative. In some known types of printer, the intensity of light incident on the negative is modulated to produce a substantially constant intensity of transmitted light. In such printers, an alternative method of assessing negative density is required in order to provide a "pause" position of rotary selector switches RS1 to RS4. Two such methods will now be described with reference to FIG 9.

In FIG. 9 elements corresponding to elements in FIG. 3 bear like designations. Elements serving comparable purposes are distinguished by the suffix $q$. The area in FIG. 9 enclosed by the broken line may be considered to include all those elements in the similarly enclosed area in FIG. 3.

Referring to FIG. 9, the element 40 provides an output which increases as the negative density increases. In one embodiment element 40 may be a photocell receiving light directly from a lamp the intensity of which is adjusted to provide a constant intensity of light transmitted by the negative. In another embodiment, element 40, may be the so adjusted printing lamp itself. The output from 40 to adder 22 would then be the voltage developed across the lamp when so adjusted.

In the standby condition of the printer, relay 29 is energised, holding switch S10$q$ in the condition opposite to that shown. Accordingly current flows through magnet 27, interrupter contacts S$_{11}$ and moving contact of RS2$q$ to ground. The rotary selector switch is therefore obliged to step forward until position 1 is reached, at which position stepping ceases.

When switch S$_1$ is closed to initiate printing of a negative, trigger circuits 5$x$, 5$y$, 5$z$, are set to a condition which removes the output from "AND" gate 20 (FIG. 3) and so produces deenergisation of relay 29. When relay 29 is deenergised, it returns switch S10$q$ to the position shown in FIG. 9. Magnet 27 is then energised and the rotary selector steps progressively under control of the interrupter contacts S$_{11}$. As selector switch rotates, the moving contact of RS1$q$ receives a progressively smaller proportion of the output voltage of reference source 21$q$. When the so derived proportion is equal in magnitude to the output from element 40, the output from adder 22 falls to zero and trigger 23 energises relay 24, opening S$_8$ and inhibiting further stepping of the selector switch. The selector switch is thus arrested in a "pause" position analogous to that referred to in connection with FIG. 3. Embodiments are therefore possible in connection with FIG. 9 which are directly comparable with those already described with reference to FIG. 3.

When exposure to all three colours is complete, gate 20 delivers an output which, after a delay governed by delay circuit 28, causes relay 29 to energise and operate switch S10q so that the selector switch steps to the standby position 1 as previously described.

It will be understood that within the scope of this invention there is a wide range of alternatives in choice of circuit elements and their interconnection. Any known type of reversible integrator may be used in place of the assemblies shown at 11, 12, 13. Not only could each such assembly be replaced by a reversible stepping motor of known type, but alternatively it could be replaced by, for example, an electrolytic cell, also of known type, which by variable obstruction of a beam of light changes the attenuation of a potentiometer at least one part of which includes a photoresistor receiving light passing the electrolytic cell.

The invention includes also known alternative means of assessing, interrelating and acting upon assessments of negative transmittance. Whereas embodiments have been described in which the classification of negative density is based on the density to light of one colour (specifically red), the classification may be performed separately for light intending any or all colours, red, green and blue. Furthermore, whereas the selection of alternative subcircuits for alternative negative processes has been described in an embodiment sensitive to a different sequence of exposure termination, it is to be understood that any alternative methods of distinguishing difference in the ratios of transmittances of light of two or more colours is equally applicable to such an embodiment of the invention.

The invention is applicable both to negative-positive printing and to positive-positive printing.

The invention includes known alternatives in which the pushbutton corrections producing changes in potentiometer settings are in respect of colour correction only, or in respect of density correction only, or are in respect of the combination of colour and density corrections.

The invention also includes known alternative arrangements in which prints are exposed, processed and examined, signals being transmitted to differential accumulators in respect of such print examination, the differential accumulators being connected to exposure control integrators of the printer to provide corrections to subsequently controlled exposure integrals. In such alternative arrangements it is not necessary to print negatives a second time. The pushbuttons controlling the differential accumulators can be situated remotely from the printer e.g. at a table at which print examination is carried out.

It will be appreciated that in carrying out the process of this invention the assessment of excess or efficiency of an image forming constituent may be effected visually, photoelectrically or by any other means.

I claim as my invention:

1. A method of printing transparencies onto photographic print material which comprises exposing print material to light in a spectral band until a predetermined integral of light against time has been administered, as determined by a photoelectric exposure integrator, processing said print material to produce a visible image, assessing said print material after processing to detect excess or deficiency of that image forming constituent controlled by exposure to light in said spectral band, producing in respect of a print showing such excess a signal of a first form and in respect of a print showing such deficit a signal of a second form, applying signals of said first and second forms to a differential accumulator, the output of which changes in one sense in response to signals of said first form and in the reverse sense in response to signals of said second form, and providing connection between said differential accumulator and said photoelectric integrator such that an excess of signals of said first form over signals of said second form causes the predetermined integral of light against time to be adjusted in value so that subsequent prints will contain a reduced amount of image-forming constituent after processing and a deficiency of signals of said first form relative to signals of said second form causes the predetermined integral of light against time to be adjusted in value so that subsequent prints will contain an increased amount of image-forming constituent after processing.

2. A method of printing multicolour transparencies onto multicolour print material selectively sensitive to light in three spectral bands, which method comprises effecting with respect to each particular band the steps of exposing print material to light in said particular band until a predetermined integral of light against time has been administered, as determined by a photoelectric exposure integrator, processing said print material to colour, assessing said print material after processing to detect excess or deficiency of that dye or pigment controlled by exposure to said particular spectral band, producing in respect of a print showing such excess a signal of a first form and in respect of a print showing such deficit a signal of a second form, applying signals of said first and second forms to a differential accumulator, the output of which changes in one sense in response to signals of said first form and in the reverse sense in response to signals of said second form, and providing connection between said differential accumulator and said photoelectric integrator such that an excess of signals of said first form over signals of said second form cause the predetermined integral of light against time to be adjusted in value so that subsequent prints will contain a reduced amount of colour providing substance after processing to colour and a deficiency of signals of said first form relative to signals of said second form cause the predetermined integral of light against time to be adjusted in value so that subsequent prints will contain an increased amount of colour providing substance after processing to colour.

3. A method according to claim 2 wherein multicolour transparencies are classified into a plurality of categories according to their integrated transmittances, a separate differential accumulator being associated with each combination of one of said spectral bands and one of said categories, each accumulator receiving signals of said first and second forms in respect only of prints from transparencies classified into the corresponding category, the output of each accumulator being connected to the photoelectric integrator controlling exposure to the corresponding spectral band to predetermine an integral of printing light against time which integral is effective only when printing negatives classified as belonging to that particular category.

4. A method according to claim 2 wherein multicolour transparencies are classified into a plurality of categories according to their integrated transmittances said categories being subdivided into subcategories according to mutually exclusive ranges of the ratios of integrated transmittances to light in separate spectral bands, red, green and blue, of the spectrum of printing light, a separate differential accumulator being associated with each combination of one of said spectral bands and one of said subcategories, each accumulator receiving signals of said first and second forms in respect only of prints from transparencies classified into the corresponding subcategory, the output of each accumulator being connected to the photoelectric integrator controlling exposure to the corresponding spectral band to predetermine an integral of printing light against time which integral is effective only when printing negatives classified as belonging to that particular subcategory.

5. An apparatus for printing transparencies onto photographic print material which comprises a photographic printer including means for exposing print material to light in a spectral band, a photoelectric exposure integrator connected to control the integral of light against time in respect of exposure in said spectral band to a predetermined value, means for detecting excess or deficiency of that image forming constituent which is controlled by the said exposure, means for producing in respect of a print showing such excess an electrical signal in a first form and in respect of a print showing such deficiency an electrical signal in a second form, a differential accumulator, means for feeding to the differential accumulator the signals of said first and second forms, and electrical means connecting the output of said differential accumulator to said photoelectric exposure integrator to modify the said predetermined value of the integral of light against time to correct such deficiency or excess of image forming constituent.

References Cited

UNITED STATES PATENTS

| | | | |
|---|---|---|---|
| 2,969,016 | 1/1961 | Crosfield et al. | 88—24 XR |
| 3,090,289 | 5/1963 | Gundelfinger | 95—73 |
| 3,171,340 | 3/1965 | Mauby | 95—73 |
| 3,275,741 | 9/1966 | Hughes et al. | 88—24 XR |
| 3,298,296 | 1/1967 | Mey | 95—73 |
| 3,355,984 | 12/1967 | Puschmann | 95—73 XR |

NORTON ANSHER, *Primary Examiner*

C. B. FUNK, *Assistant Examiner.*

U.S. Cl. X.R.

355—83, 88